US011635605B2

(12) United States Patent
Aizawa et al.

(10) Patent No.: US 11,635,605 B2
(45) Date of Patent: Apr. 25, 2023

(54) MICROSPECTROSCOPE HAVING POSITION CORRECTION FUNCTION

(71) Applicant: JASCO Corporation, Tokyo (JP)

(72) Inventors: Kento Aizawa, Tokyo (JP); Yoshiko Kubo, Tokyo (JP); Norihito Fujiwara, Tokyo (JP); Katsunori Morii, Tokyo (JP)

(73) Assignee: JASCO Corporation, Tokyo (JP)

( * ) Notice: Subject to any disclaimer, the term of this patent is extended or adjusted under 35 U.S.C. 154(b) by 437 days.

(21) Appl. No.: 16/782,716

(22) Filed: Feb. 5, 2020

(65) Prior Publication Data

US 2020/0292802 A1   Sep. 17, 2020

(30) Foreign Application Priority Data

Feb. 15, 2019   (JP) .............................. JP2019-025323

(51) Int. Cl.
*G01J 3/06*   (2006.01)
*G01J 3/44*   (2006.01)
(Continued)

(52) U.S. Cl.
CPC ........ *G02B 21/0024* (2013.01); *G01J 3/0205* (2013.01); *G01J 3/0289* (2013.01); *G01J 3/06* (2013.01); *G01J 3/44* (2013.01)

(58) Field of Classification Search
CPC . G02B 21/0024; G02B 21/365; G01J 3/0205; G01J 3/0289; G01J 3/06; G01J 3/44
See application file for complete search history.

(56) References Cited

U.S. PATENT DOCUMENTS

2014/0118499 A1    5/2014   Shibata
2018/0307027 A1*  10/2018   Yokota ................. G02B 21/367
2019/0391012 A1   12/2019   Kokota et al.

FOREIGN PATENT DOCUMENTS

JP         9-15046 A      1/1997
JP    2004191846 A      7/2004
(Continued)

OTHER PUBLICATIONS

Japanese Office Action (JPOA) dated Oct. 28, 2022 issued in Japanese Patent Application No. 2019-025323 and its machine English translation.

*Primary Examiner* — Christine S. Kim
(74) *Attorney, Agent, or Firm* — Rankin, Hill & Clark LLP (57) ABSTRACT

The present invention relates to improvement in accuracy of an automatic sample detection technique in spectrometry of a microspectroscope.
A microspectroscope 10 comprises: a light source 12 that emits an excitation light to a sample 20; a condensing lens 16 that emits the excitation light to a predetermined position of the sample 20 and condenses a reflected light or a transmitted light from the sample 20; a spectrometer 24 that detects a condensed light; and an analysis control unit 30 for analyzing a signal from the spectrometer 24; the microspectroscope 10 that uses an observation image of the sample 20 to perform spectrometry, wherein
the analysis control unit 30 comprises: an image storage part 32 that converts the observation image to an all-in-focus image to store the all-in-focus image; and a control part 34 that makes the microspectroscope 10 to perform measurement, and
the control part 34 uses the all-in-focus image and performs a template matching as a matching action of the
(Continued)

image to perform position correction to a position deviation of a sample point that is a target of spectrometry in the sample.

7 Claims, 12 Drawing Sheets

(51) Int. Cl.
*G01J 3/02* (2006.01)
*G02B 21/00* (2006.01)

(56) References Cited

FOREIGN PATENT DOCUMENTS

| | | | | |
|---|---|---|---|---|
| JP | 2014089321 A | | 5/2014 | |
| JP | 2017049043 A | * | 3/2017 | ............ G01J 3/0208 |
| WO | WO-2017005909 A1 | * | 1/2017 | |
| WO | 2018138098 A1 | | 8/2018 | |

\* cited by examiner

FIG.3 obtain image while scanning Stage Z

FIG. 12 a light source that emits an excitation light to a sample; a condensing lens that makes the excitation light incident on a predetermined position of the sample and condenses a reflected light or a transmitted light from the sample; a spectrometer that detects the condensed light; and an analysis control unit for analyzing a signal from the spectrometer; the microspectroscope that uses an observation image of the sample to perform spectrometry, wherein

MICROSPECTROSCOPE HAVING POSITION CORRECTION FUNCTION

FIELD OF THE INVENTION

The present invention relates to a microspectroscope, and particularly to improvement in accuracy of a position correction technique for a position deviation of a sample in spectrometry of a microspectroscope.

BACKGROUND OF THE INVENTION

Conventionally, spectrometry is widely known as a means for identifying a substance contained in a sample. In Raman spectrometry, for example, a Raman scattering light generated from a sample by an excitation light is detected to identify a substance contained in a sample based on a difference of frequency between the excitation light and the Raman scattering light (Raman shift).

Usually, when there are many measurement points in Raman spectrometry, cumulative error due to movement of a movable stage or changes in positional relationship between the sample and each optical part due to thermal expansion by temperature change may occur. As a countermeasure, spectrometry can be performed while performing correction based on an algorithm of some kind such as calculating the positional change from measurement condition. However, there are various parameters with respect to positional changes; and, depending on measurement condition and the kind of the sample, there are many cases that the problem cannot be solved only with a predetermined algorithm.

Patent Literature 1 discloses a technique of: performing spectrometry in advance to a standard sample by a two-dimensional colorimeter that employs a spectroscope; storing this measurement result to a storing means as a position correction information; and obtaining a spectroscopic image of which distortion correction is performed by a distortion correcting means based on the position correction information at the time of measuring the sample. That is, Patent Literature 1 discloses a technique capable of measuring an accurate spectroscopic intensity distribution by a spectroscopic image of which effects caused by a position deviation of the sample and the optical parts or aberration of a lens are corrected.

CITATION LIST

Patent Literature

PATENT LITERATURE 1: Japanese Unexamined Patent Publication No. H09-15046 A1

DISCLOSURE OF THE INVENTION

Problem to be Solved by the Invention

As in Patent Literature 1, as long as a position correction information can be obtained by a standard sample, an accurate spectroscopic intensity distribution can be obtained from a spectroscopic image of which distortion correction is performed at sample measurement; however, it is difficult to utilize this technique as it is in measurement of unknown samples or inspection of foreign substances. Furthermore, it is needless to say that deviation of the focal point naturally occurs in each region in the spectroscopic image in measurement of the standard sample. As a result, it cannot be said that the position correction information is always accurate, and it is difficult to obtain an accurate measurement result depending on the kind of the sample to be subjected to spectrometry.

The present invention has been accomplished in view of the problems of the above-mentioned conventional art, and an object thereof is to accomplish a microspectroscope having a position correction function that can suppress a position deviation between a sample and an optical component caused by changing of components or a long-time measurement, and can perform spectrometry with a better accuracy compared to the conventional type.

Means to Solve the Problem

In order to solve the above-mentioned problem, a microspectroscope according to the present invention comprises:

the analysis control unit comprises: an image storage part that converts the observation image to an all-in-focus image and stores the all-in-focus image; and a control part that makes the microspectroscope to perform measurement, and the control part uses the all-in-focus image and performs a template matching as a matching action of the image to perform position correction to a position deviation of a sample point that is a target of spectrometry in the sample.

In the microspectroscope according to the present invention, the image storage part adds a height position information of the sample point to the all-in-focus image to create a position correction image data, and uses the position correction image data to perform position correction to the position deviation of the sample point.

In the microspectroscope according to the present invention, the objective lens comprises a revolver for switching a low magnification objective lens for microscopic measurement and a high magnification objective lens for spectrometry, and the control part performs position correction to the position deviation caused by a switching action of the low magnification objective lens and the high magnification objective lens.

In the microspectroscope according to the present invention, the control part performs position correction to the position deviation caused by cumulative error due to a long-time measurement.

Effect of the Invention

According to the present invention, an observation image is converted to obtain an all-in-focus image, and the all-in-focus image is used to perform position correction by template matching as a matching action of the image. Therefore, the present invention can provide a microspectroscope having a position correction function capable of performing spectrometry with a better accuracy than the conventional type without being affected by a position deviation caused by changing of components or a long-time measurement.

BEST MODE FOR CARRYING OUT THE INVENTION

Hereinbelow, the microspectroscope of the present invention is described with reference to the figures; however, the present invention is not limited to the examples given below unless the scope of the present invention is exceeded.

Figure 1:
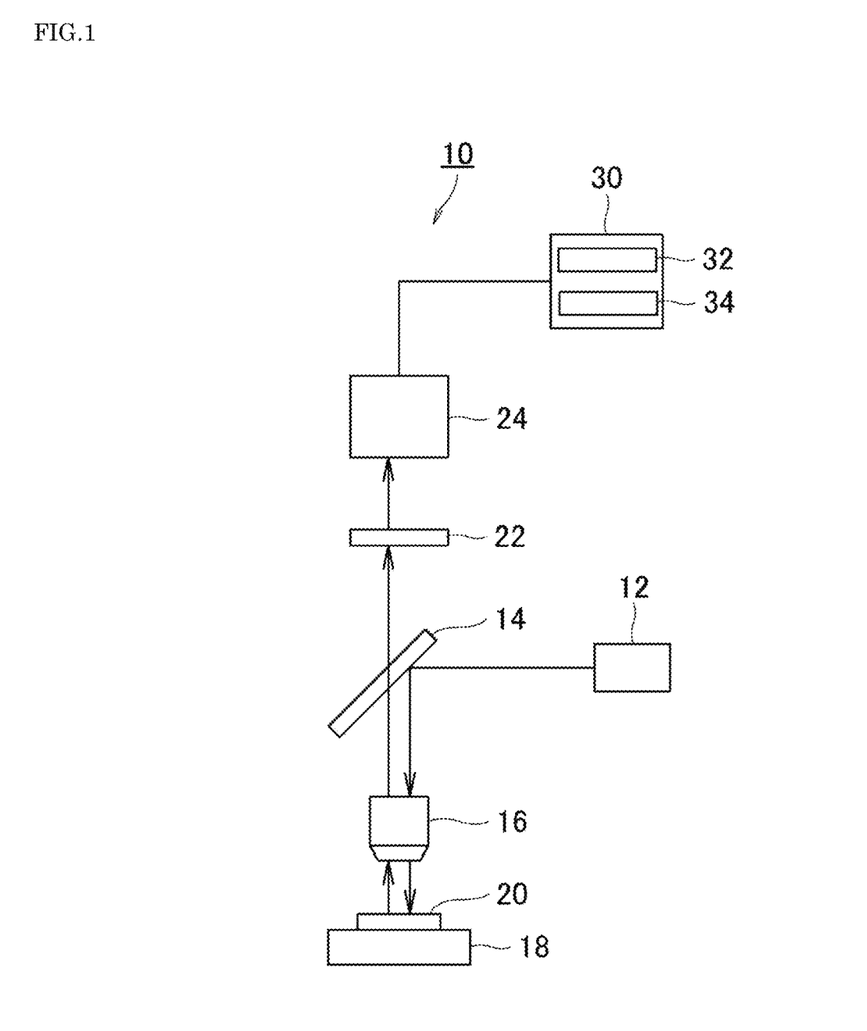
FIG. 1 is a schematic configuration of a Raman microspectroscope according to an embodiment of the present invention.

FIG. 1 shows a schematic configuration of a microspectroscope according to an embodiment of the present invention. The microspectroscope according to the present embodiment is a Raman microspectroscope. A Raman microspectroscope 10 shown in FIG. 1 comprises: a light source 12 that emits an excitation light to a sample 20; a beam splitter 14 that guides the excitation light towards the sample 20; an objective lens 16 that emits the excitation light to a predetermined position of the sample 20 and has a condensing lens function to condense a reflected light from the sample 20; a movable stage 18 where the sample 20 is placed onto; a filter 22 that eliminates a predetermined light that is unnecessary for measurement among the reflected light condensed from the sample 20; a spectrometer 24 that detects a Raman scattering light that passed through the filter 22; and a computer 30 as an analysis control unit connected to the spectrometer 24. The computer 30 comprises an image storage part 32 that stores an observation image obtained by microscopic measurement, and a control part 34 that makes the Raman microspectroscope 10 to perform measurement action.

First of all, a brief flow of Raman spectrometry is described. The excitation light emitted from the light source 12 is reflected by the beam splitter 12 toward the sample 20, and passes through the objective lens 16 to be emitted onto a predetermined position of the sample 20. The excitation light emitted from the sample 20 makes a light (Raman scattering light) that is different from the excitation light scatter from the sample 20.

The objective lens 16 takes in the Raman scattering light (the objective lens 16 also acts as a condensing lens), and then the Raman scattering light passes through the filter 22 to proceed towards the spectrometer 24. A rejection filter such as a notch filter or an edge filter, for example, can be employed as the filter 22 in the present embodiment.

The Raman scattering light detected by the spectrometer 24 is taken into the computer 30, and is subjected to a predetermined analysis as a spectral data in accordance with a purpose. The Raman spectrometry in the present embodiment is schematically performed in such way. In actual Raman spectrometry, for example, position deviation of the sample 20 occurs often by the effect of cumulative error due to the movement of the movable stage 18 or thermal expansion due to temperature change.

Accordingly, the Raman microspectroscope 10 according to the present embodiment has a position correction function to the position deviation of a sample point that is a target of spectrometry in the sample, so that it will not be affected by such position deviation. Hereinbelow, the position correction function that is a characteristic function of the present invention will be described in detail.

<Position Correction Function>

Figure 2:
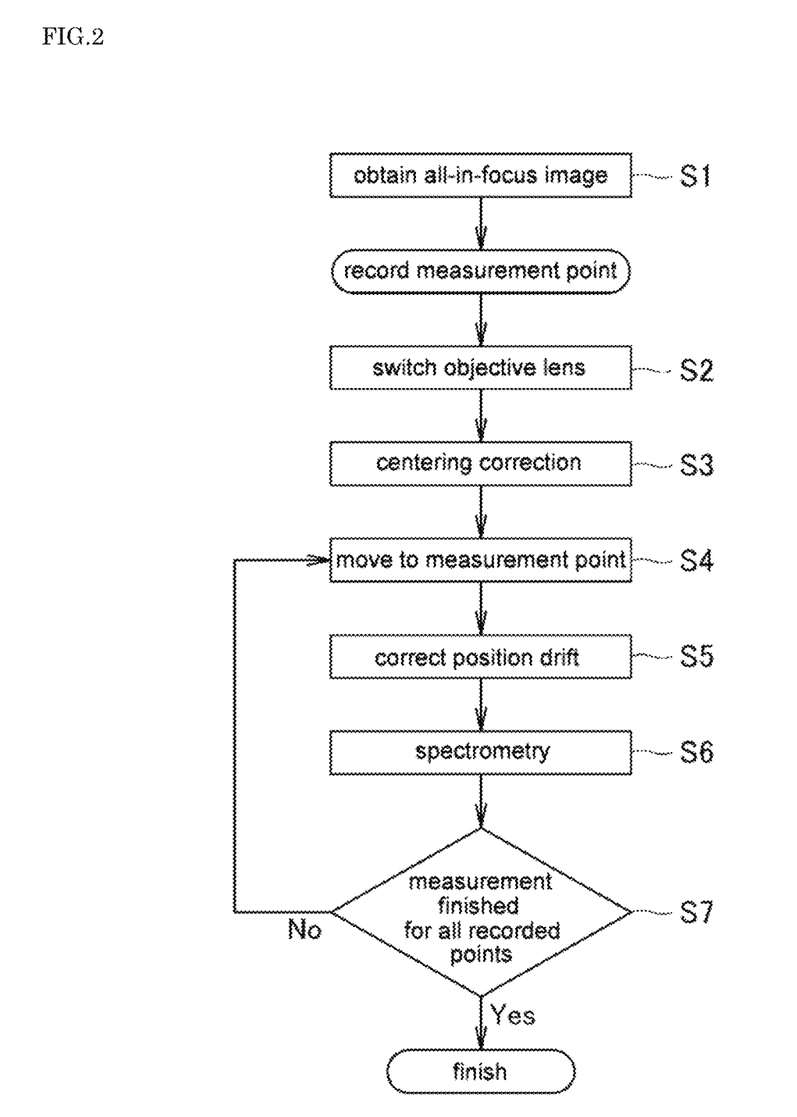
FIG. 2 is a flow chart of a position correction function in the Raman microspectroscope according to the present embodiment.

FIG. 2 shows a flow chart of the position correction function in the Raman microspectroscope according to the present embodiment. The flow chart of FIG. 2 shows each process or step before and during Raman spectrometry performed by the Raman microspectroscope 10.

First of all, as shown in FIG. 2, an all-in-focus image of the sample 20 is obtained (S1). The all-in-focus image as used herein is an observation image of which all the region where microscopic measurement is performed by the Raman microspectroscope 10 is in focus, or an observation image of which a processing of some kind for making all region to be in focus is performed to.

Figure 3:
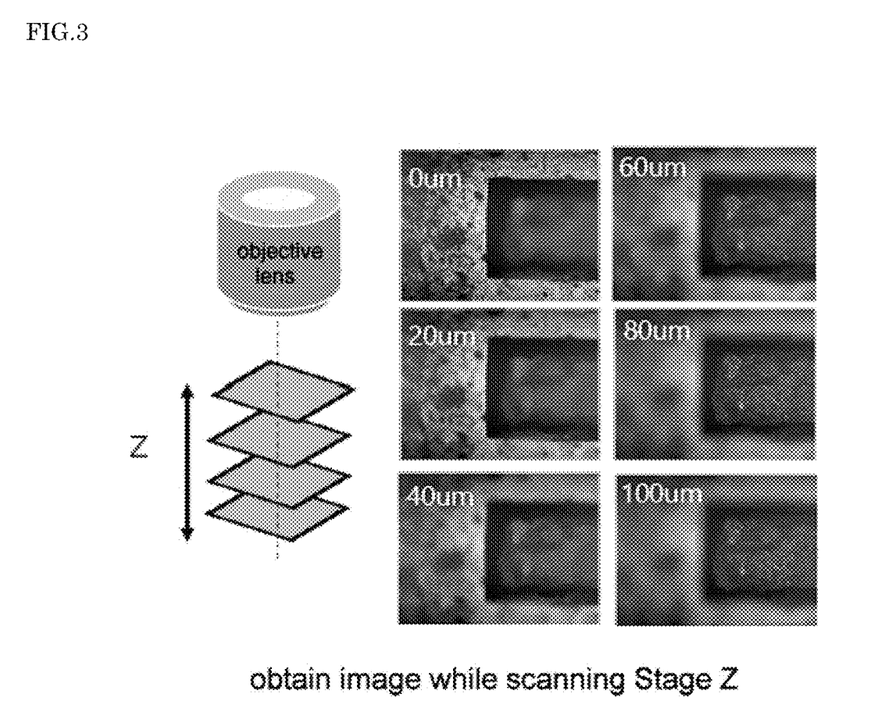
FIG. 3 is a schematic diagram of a method to obtain an all-in-focus image in the Raman microspectroscope according to the present embodiment.

As shown in FIG. 3, for example, a clear all-in-focus image without a blur can be obtained by synthesizing a plurality of images having different focal points. Moreover, upon obtaining the all-in-focus image, a height information of the sample 20 can be obtained simultaneously. Furthermore, the all-in-focus image in the present embodiment may be obtained by automatically focusing each point simultaneously with microscopic measurement; however, it can also be obtained by storing an observation image of which microscopic measurement is performed to in the image storage part 32 of FIG. 1, and performing a predetermined processing to process it into an all-in-focus image, for example.

In the present embodiment, the sample point that is the target of spectrometry in the sample 20 is recorded as a measurement point in advance as a preliminary stage of spectrometry. This recorded measurement point is subjected to spectrometry by the Raman microspectroscope 10. For example, the sample point as the target of spectrometry may be set so that it can be automatically detected by the observation image as a preliminary stage of spectrometry, and the result thereof may be recorded as the measurement point.

Figure 4:
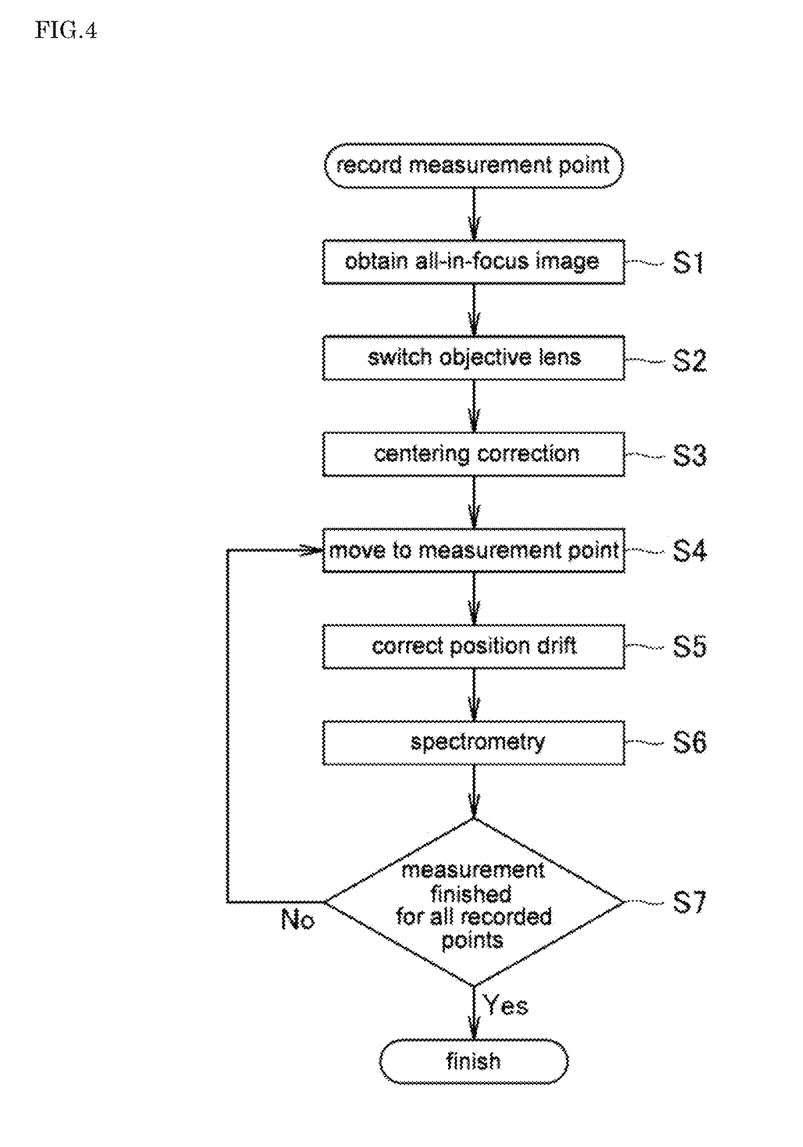
FIG. 4 is another flow chart of the position correction function in the Raman microspectroscope according to the present embodiment.

In the present embodiment, the all-in-focus image obtained in S1 of the flow chart can be used to automatically detect the sample point. As shown in the flowchart of FIG. 4, the measurement point of the sample point may be recorded in advance by a method of some kind, and then S1 and S2 to S7, to be described later, may be performed.

Next, a switching action of the objective lens 16 of which the Raman microspectroscope 10 comprises is performed in S2. For example, an automatic revolver is used to automatically switch the low-magnification objective lens to the high-magnification objective lens (not shown in FIG. 1). In the present embodiment, the switching action from the low-magnification objective lens to the high-magnification objective lens is automatically performed by the automatic revolver, but it may be performed manually.

Figure 5:
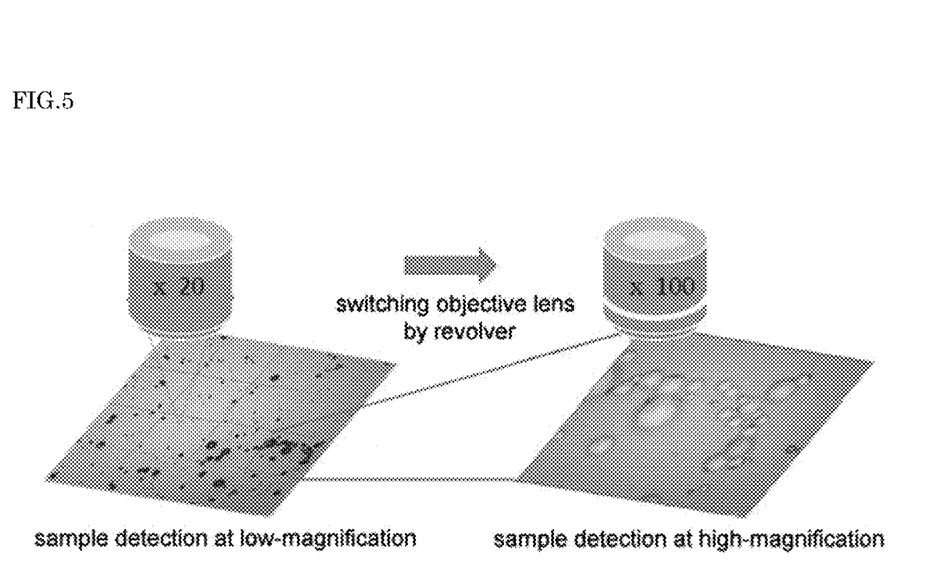
FIG. 5 is a schematic diagram of switching of an objective lens in the Raman microspectroscope according to the present embodiment.

FIG. 5 shows a schematic diagram of switching of the objective lens in the Raman microspectroscope according to the present embodiment. As shown in FIG. 5, for example, a 20× low-magnification objective lens that can measure a wide range of the sample is switched to a 100× high-magnification objective lens in order to perform spectrometry in more detail to the measurement point where the preliminarily recorded sample point is positioned.

When the objective lens is switched by the revolver (or the automatic revolver), a position deviation occurs between the sample 20 and the objective lens 16 (or in the optical path from the light source 12 and the sample 20). Thus, in the present embodiment, a centering correction is performed to this position deviation before performing spectrometry (S3).

Figure 6:
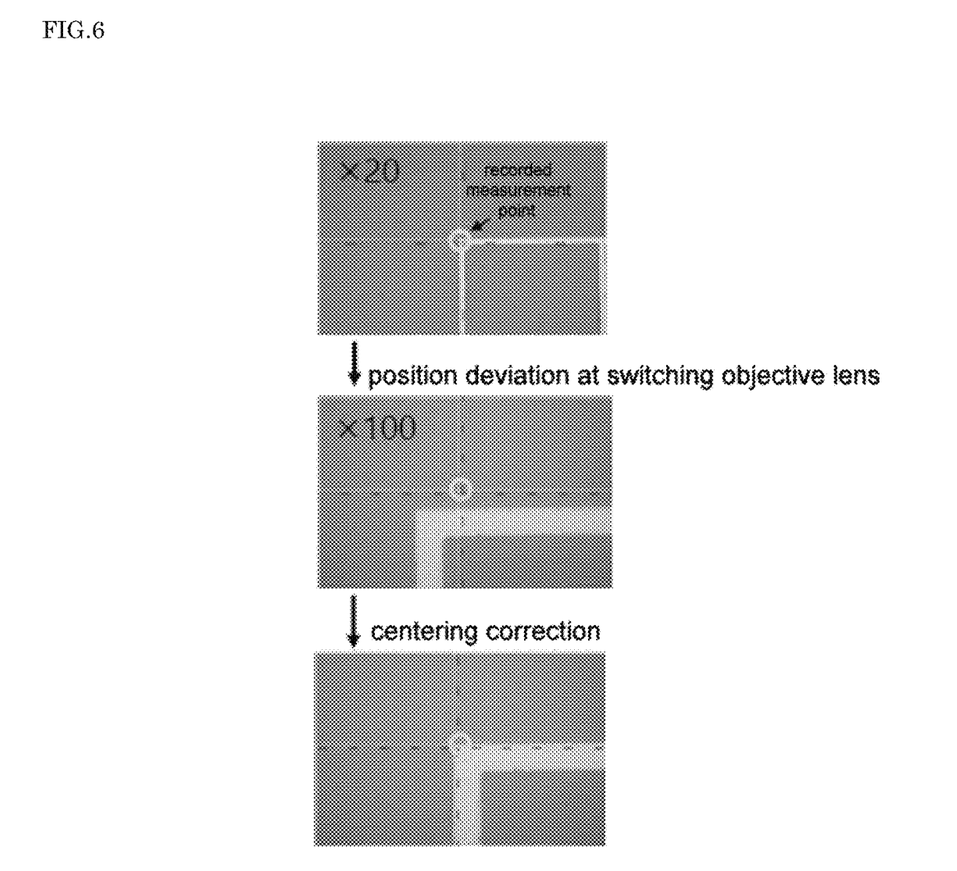
FIG. 6 is a schematic image diagram of correction of misalignment and centering upon switching of the objective lens in the present embodiment.

FIG. 6 shows a schematic image diagram of a misalignment that occurs when the objective lens is switched and a centering correction in the present embodiment. As shown in FIG. 6, it can be seen that the recorded measurement point is deviated by switching the 20× low-magnification objective lens to the 100× high-magnification objective lens. This position deviation causes an error in spectrometry. Thus, in the present embodiment, the centering correction is performed with the all-in-focus image obtained in advance in S1 to achieve satisfactory position correction.

Figure 7:
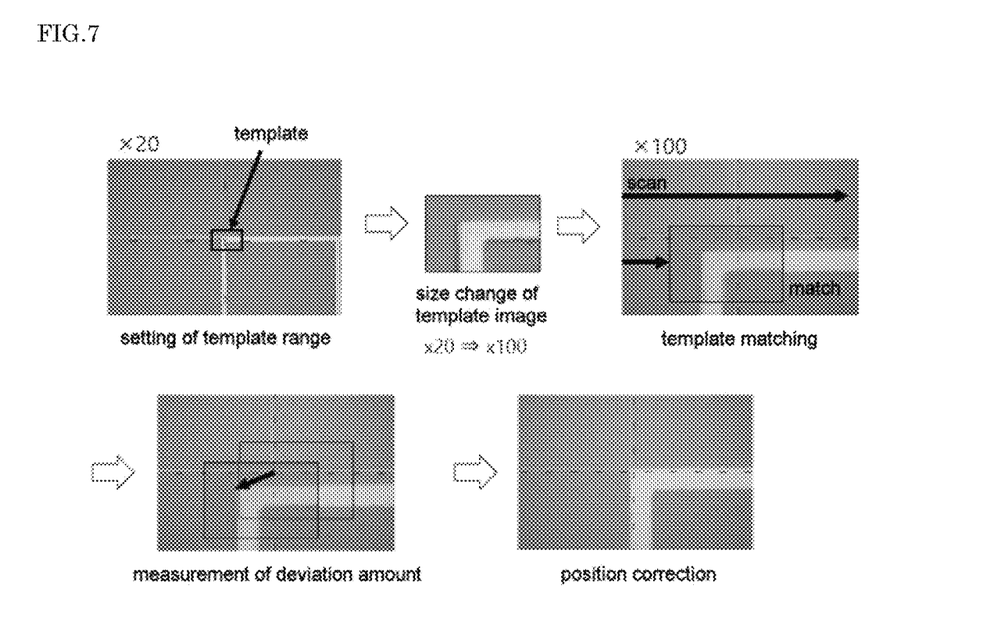
FIG. 7 is a schematic explanation diagram of centering correction that uses the all-in-focus image according to the present embodiment.

Specifically, as shown in FIG. 7, a template image range is set with the observation image of the low-magnification objective lens (20×), and then it is changed into the size of the template image of the high-magnification lens (100×). Then, the template image and the all-in-focus image obtained in advance are subjected to a matching action of the image by a scanning action to calculate a deviation amount and perform the centering correction. As described, a position correction that is more accurate than before can be achieved by performing the centering correction by template matching as a matching action of the image with the all-in-focus image.

Figure 8:
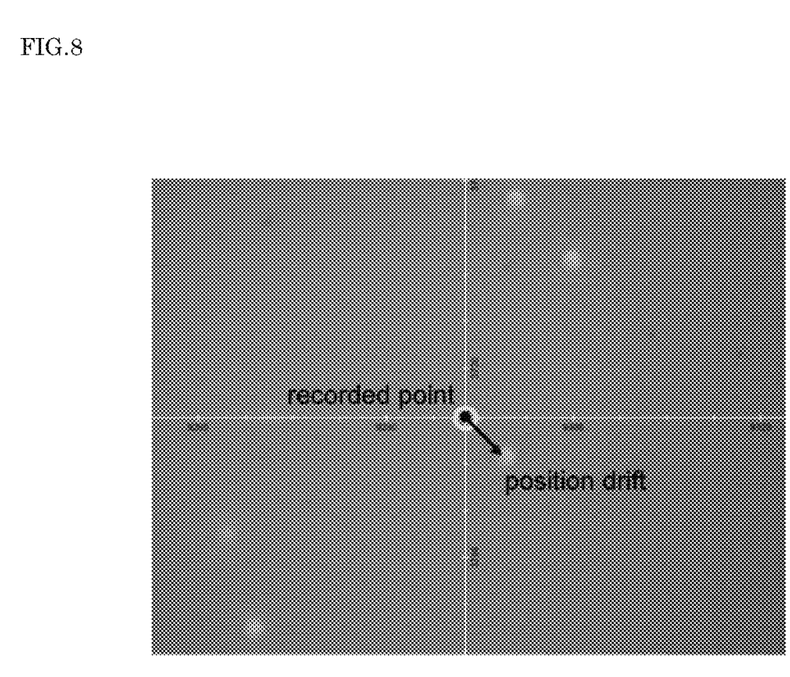
FIG. 8 is a schematic image diagram of position drift caused when the objective lens moves to a measurement position in the present embodiment.

After the accurate position correction is performed by the centering correction in S3, the objective lens moves to a measurement position (S4). In actual spectrometry, a position deviation occurs at this time, too. FIG. 8 shows a schematic image diagram of a position drift that occurs when the objective lens moves to the measurement position. As shown in FIG. 8, when the measurement time becomes longer, a position drift is caused to the recorded point by the movement to the measurement point after the centering correction. In particular, a position drift of about several μm is caused by effects of a temperature drift or repeatability of the movable stage. As in the present embodiment, this position drift cannot be ignored when a microscopic region of the sample 20 is to be subjected to Raman spectrometry.

Figure 9:
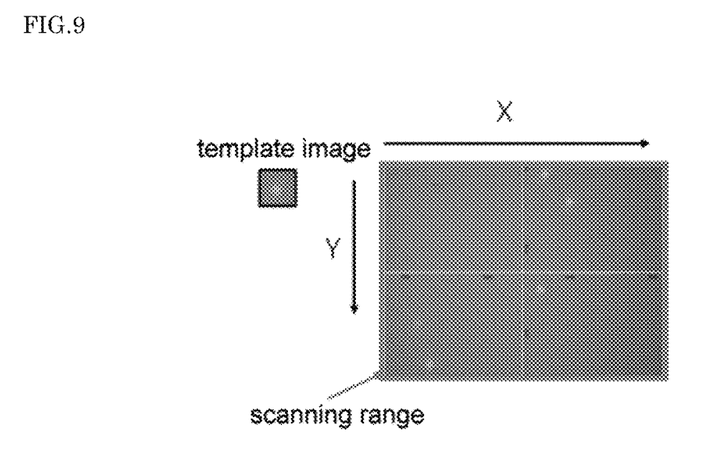
FIG. 9 is a schematic diagram of a template image size and a scanning range in conventional correction of position drift.

Accordingly, in the present embodiment, correction of the position drift is performed by template matching (matching action of the image) that uses the all-in-focus image is performed to this position drift, too (S5). In such position correction, as shown in FIG. 9, there are regions where the focal point is not in focus in the photographed image. Therefore, in order to cover such this, a template matching needs to be performed by scanning a wide range. However, when the scanning range is large as such, the template matching may not be performed accurately.

Figure 10:
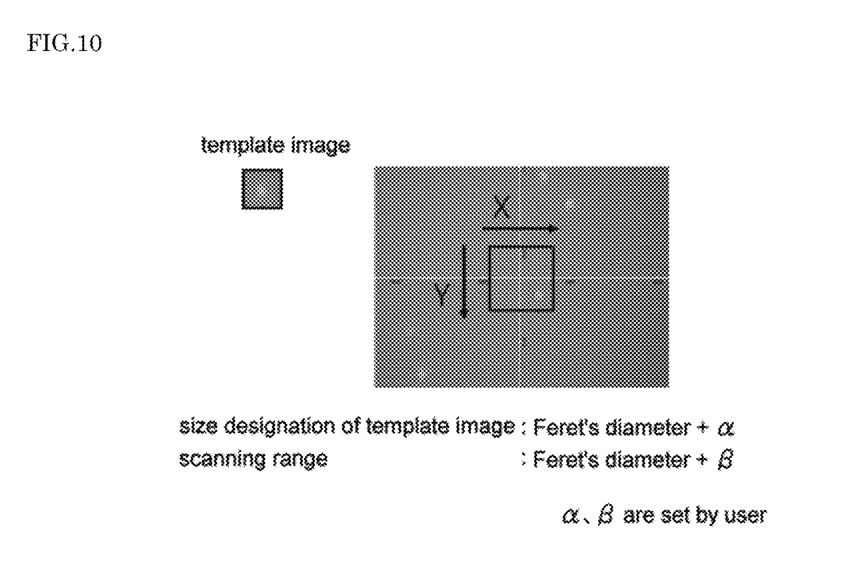
FIG. 10 is a schematic diagram of a template image size and a scanning range in correction of position drift of the present invention.

Accordingly, as shown in FIG. 10, the all-in-focus image is used in the present embodiment, so that the template matching can be performed with a narrowed scanning range: therefore, an accurate correction of the position drift can be achieved. The template matching as used herein is a matching technique to extract the shape of the sample point or specify the sample point by overlapping the all-in-focus image and the image obtained by the following spectrometry, for example. In the present embodiment, the template matching that uses the all-in-focus image is performed, but matching can be performed with an image other than the all-in-focus image, for example.

Specifically, a range larger than a Feret's diameter of the sample point can be set individually as the size and the scanning range of the template image of FIG. 10. For example, the Feret's diameter of the sample point+α can be set as the size of the template image, and the Feret's diameter of the sample point+β can be set as the scanning range (α and β are optionally set by the user).

Figure 11:
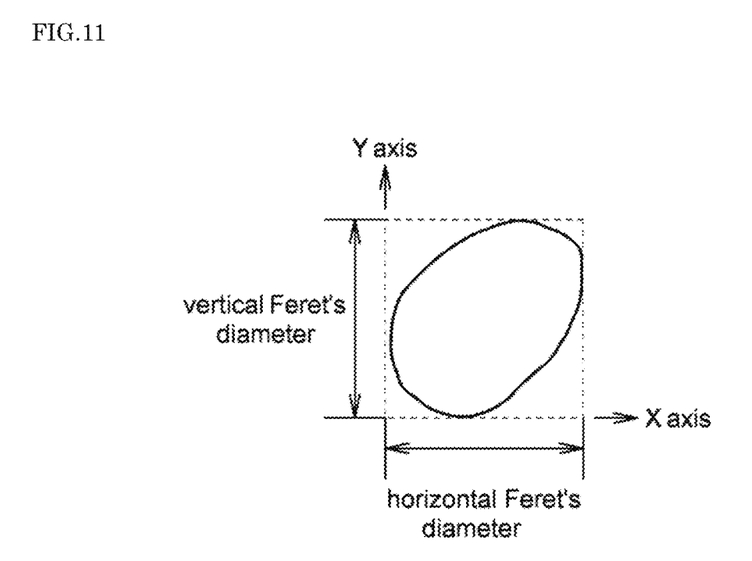
FIG. 11 is a schematic explanation diagram regarding a Feret's diameter of a sample point in the present embodiment.

With respect to the Feret's diameter as used in the present embodiment, the length of the side parallel to the X-axis of a bounding rectangle as shown in FIG. 11 is referred to as a horizontal Feret's diameter, the length of the side parallel to the Y-axis of the bounding rectangle is referred to as a vertical Feret's diameter; and they are generally called as the Feret's diameter. An accurate position correction can be achieved by limiting the size of the template image and the scanning range in the all-in-focus image.

After performing correction of the position drift in S5 of FIG. 2, the Raman microspectroscope 10 performs spectrometry for the measurement point (sample point) in the sample 20 (S6). Then, it determines whether measurement has completed in all recorded points (S7). The Raman microspectroscope 10 repeats the position correction action and spectrometry of S4 to S7 until measurement for all the recorded points is completed. In the present embodiment, spectrometry by the Raman microspectroscope 10 finishes when measurement for all recorded positions is completed.

As described above, the Raman microspectroscope 10 according to the present embodiment obtains the all-in-focus image in advance (S1) and performs the centering correction (S3) and the drift correction (S5) by using the features of this all-in-focus image to achieve position correction that is more accurate than before.

<Position Information of the Height Direction (Z Direction)>

Figure 12:
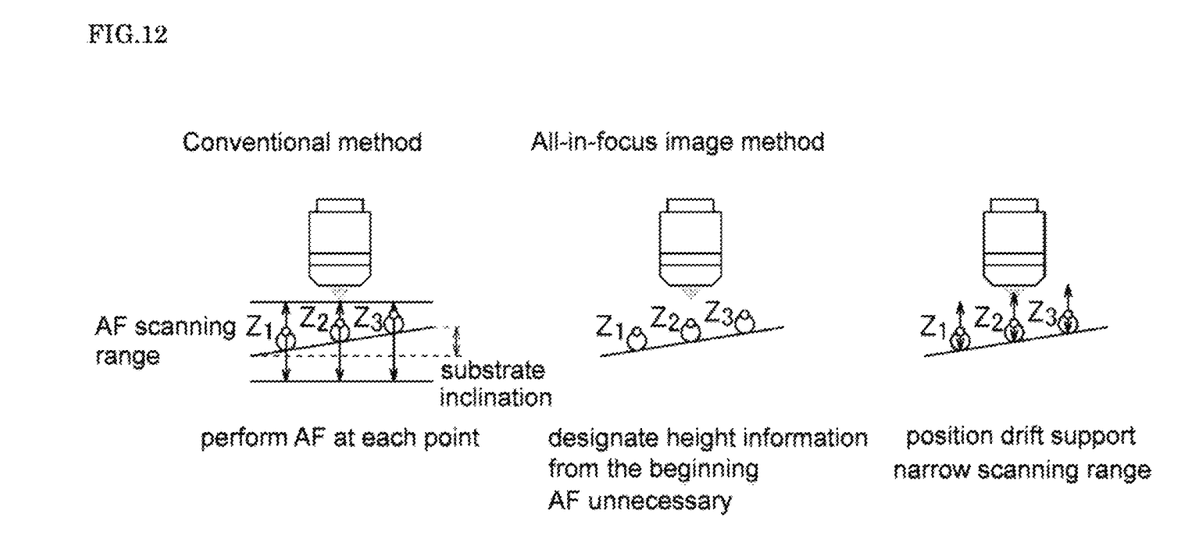
FIG. 12 is a schematic image diagram regarding inclination of the sample and a position information in the height direction in the sample.

Here, other advantages of the position correction using the all-in-focus image that is the characteristic feature of the present invention is described. FIG. 12 shows a schematic image diagram of the inclination of the sample and the position information of the height direction in the sample. In a conventional manner as shown in FIG. 12, when there is an inclination to the sample 20 placed on the movable stage 18 of FIG. 1, the photographed image does not have a position information of the height direction (or a position information of the height direction is not accurate), so that automatic focusing or the like needed to be performed for each measurement point.

In the position correction using the all-in-focus image as in the present embodiment, however, the height position information of the sample 20 is obtained from the beginning or the height position information can be added to the all-in-focus image, so that a suitable height position can be set as the measurement point. That is, in the present embodiment, each measurement point does not need to be automatically focused for each spectrometry.

In the present embodiment, the all-in-focus image added with this height position information is called as a position correction image data. For example, the position correction image data can be created by adding the height position information of the sample point to the all-in-focus image in the image storage part 32.

In a case when automatic focusing needs to be performed for correction of the position drift (S5 of the flow chart), it is not easily affected by the inclination of the sample 20 since it is sufficient to scan based on the height information recorded to the position correction image data. That is, an accurate correction of the position drift can be achieved when a small area in the vicinity of the standard point is scanned by the height information without taking the inclination of the sample 20 into account (even when automatic focusing is necessary, it is sufficient to scan a small area in the vicinity of the standard point by the height information).

Although Raman spectrometry is described in the present embodiment, the present invention is not limited to Raman spectrometry and can obtain a similar effect in other spectrometry. For example, more accurate position correction compared to the conventional manner can be achieved by performing the position correction with an all-in-focus image similar to the present embodiment in Infrared spectrometry or Ultra-violet visible spectrometry.

DESCRIPTION OF REFERENCE SIGNS

10 Raman microspectroscope
12 Light source
14 Beam splitter
16 Objective lens (condensing lens)
18 Movable stage
20 Sample
22 Filter
24 Spectrometer
30 Computer
32 Image storage part
34 Control part

What is claimed is:

1. A microspectroscope comprising:
a light source that emits an excitation light to a sample in which a sample point that is a target of spectrometry is recorded; a condensing lens that emits the excitation light to a predetermined position of the sample and condenses a reflected light or a transmitted light from the sample, the condensing lens having a low magnification objective lens and a high magnification objective lens; a spectrometer that detects a condensed light; and an analysis control unit for analyzing a signal from the spectrometer; the microspectroscope that uses an observation image of the sample to perform spectrometry,
wherein
the analysis control unit comprises:
an image storage part configured to:
obtain a plurality of sample images with regard to the sample, the plurality of sample images having different focal points each other, the plurality of sample images being captured using the low magnification objective lens while changing a distance between the low magnification objective lens and the sample in a first direction along the excitation light and not changing a positional relationship between the low magnification objective lens and the sample in a second direction perpendicular to the first direction; and
obtain an all-in-focus image by synthesizing areas in focus in the plurality of the sample images to store the all-in-focus image; and
a control part configured to:
switch to the high magnification lens;
calculate a deviation amount between the sample point in the all-in-focus image and the sample point in a high magnification image;
perform centering correction by position correction to a position deviation of the sample; and
perform spectrometry for the sample point using the high magnification lens.

2. The microspectroscope according to claim 1, wherein the image storage part adds a height position information of the sample point to the all-in-focus image to create a position correction image data, and uses the position correction image data to perform position correction to the position deviation of the sample point.

3. The microspectroscope according to claim 2, wherein the objective condensing lens comprises a revolver for switching the low magnification objective lens for microscopic measurement and the high magnification objective lens for spectrometry, and
the control part performs the position correction to the position deviation caused by a switching action of the low magnification objective lens and the high magnification objective lens.

4. The microspectroscope according to claim 2, wherein the control part performs the position correction to the position deviation caused by cumulative error due to a long-time measurement.

5. The microspectroscope according to claim 1, wherein the condensing lens comprises a revolver for switching the low magnification objective lens for microscopic measurement and the high magnification objective lens for spectrometry, and
the control part performs the position correction to the position deviation caused by a switching action of the low magnification objective lens and the high magnification objective lens.

6. The microspectroscope according to claim 1, wherein the control part performs the position correction to the position deviation caused by cumulative error due to a long-time measurement.

7. A method of controlling a microspectroscope including a light source that emits an excitation light to a sample in which a sample point that is a target of spectrometry is recorded; a condensing lens that emits the excitation light to a predetermined position of the sample and condenses a reflected light or a transmitted light from the sample, the condensing lens having a low magnification objective lens and a high magnification objective lens; a spectrometer that detects a condensed light; and an analysis control unit for analyzing a signal from the spectrometer, the method comprising:

obtaining a plurality of sample images with regard to the sample, the plurality of sample images having different focal points each other, the plurality of sample images being captured using the low magnification objective lens while changing a distance between the low magnification objective lens and the sample in a first direction along the excitation light and not changing a positional relationship between the low magnification objective lens and the sample in a second direction perpendicular to the first direction;

obtaining an all-in-focus image by synthesizing areas in focus in the plurality of the sample images to store the all-in-focus image;

switching to the high magnification lens;

calculating a deviation amount between the sample point in the all-in-focus image and the sample point in a high magnification image;

performing centering correction by position correction to a position deviation of the sample; and performing spectrometry for the sample point using the high magnification lens.

\* \* \* \* \*